United States Patent
Nagai

(10) Patent No.: US 6,435,031 B1
(45) Date of Patent: Aug. 20, 2002

(54) POSITION DETECTING DEVICE FOR HYDRAULIC CYLINDER, AND INDUSTRIAL VEHICLE EQUIPPED WITH THE POSITION DETECTING DEVICE

(75) Inventor: Katsumi Nagai, Aichi-ken (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/635,114

(22) Filed: Aug. 9, 2000

(30) Foreign Application Priority Data

Aug. 26, 1999 (JP) .......................................... 11-240367

(51) Int. Cl.[7] .......................... G01N 29/06; H01L 41/08
(52) U.S. Cl. ............................. 73/597; 73/662; 73/668; 310/321
(58) Field of Search .......................... 73/570, 579, 629, 73/662, 665, 667, 668, 649; 310/320, 321, 322

(56) References Cited

U.S. PATENT DOCUMENTS

| | | | |
|---|---|---|---|
| 4,936,143 A | * 6/1990 | Schutten et al. ............... | 73/597 |
| 5,052,513 A | * 10/1991 | Yoshikawa et al. .......... | 181/246 |
| 5,327,040 A | * 7/1994 | Sumihara et al. ............ | 310/323 |
| 5,578,758 A | * 11/1996 | Havira et al. ................. | 73/636 |
| 5,627,425 A | * 5/1997 | Kaida et al. .................. | 310/321 |
| 5,969,463 A | * 10/1999 | Tomita et al. ................ | 310/320 |
| 6,047,603 A | * 4/2000 | Ohtera et al. ................. | 73/649 |

FOREIGN PATENT DOCUMENTS

JP          10-238513          9/1998

* cited by examiner

Primary Examiner—Hezron Williams
Assistant Examiner—Jacques Saint-Surin
(74) Attorney, Agent, or Firm—Morgan & Finnegan, LLP

(57) ABSTRACT

An anti-vibration member is provided on an inner wall of a cylinder tube of a lift cylinder. The anti-vibration member is formed into a cylindrical form, and an outer circumferential surface thereof is formed along an inner circumferential surface of the cylinder tube. The anti-vibration member is formed by coating resin high in ultrasonic wave attenuating effect (such as polyphenylene sulfide (PPS) resin). It is possible to attenuate or absorb a vibration of a surface wave transmitted from an ultrasonic wave sensor and indirectly transmitted through the inner wall of the cylinder tube.

12 Claims, 8 Drawing Sheets

PRIOR ART

POSITION DETECTING DEVICE FOR HYDRAULIC CYLINDER, AND INDUSTRIAL VEHICLE EQUIPPED WITH THE POSITION DETECTING DEVICE

BACKGROUND OF THE INVENTION

1. Field of the Invention

The present invention relates to a lift cylinder (a hydraulic cylinder) in a fork lift, and in particular to a technology for detecting a position of a piston in the lift cylinder.

2. Description of the Related Art

In general, a lift cylinder (a hydraulic cylinder) is installed in a fork lift to move a fork upwardly and downwardly. By reciprocating a piston rod in the lift cylinder, the fork is moved upwardly and downwardly. Hence, in a case where various controls are applied to the fork in the fork lift having the lift cylinder, the upwardly and downwardly moved positions and upwardly and downwardly moving speeds of the fork are detected by measuring a position and a moving speed of the piston rod (the piston) of the lift cylinder.

As means for detecting the position or the moving speed of the piston of the lift cylinder, an ultrasonic wave sensor is typically used. An example of the lift cylinder using such ultrasonic wave sensor is described in Japanese Patent Laid-Open No. 10-238513. An arrangement of the lift cylinder described in this publication will be briefly described with reference to FIG. 10.

As shown in FIG. 10, a lift cylinder (a single action type piston cylinder) 50 is provided with a cylinder tube 52, a cylinder block 53, a piston rod 51, a piston 54 movable integrally with the piston rod 51, and so on. A hydraulic oil is filled in the lift cylinder 50 as a power medium for the piston rod 51.

A ultrasonic wave sensor 55 is disposed so that a transmitter and receptor side thereof is confronted with a bottom surface 54a of the piston 54. The ultrasonic wave sensor 55 is provided with a vibration element 60, a case member 61 supporting the vibration element 60 and a cap member 62 covering the vibration element 60. The cap member 62 is made of metal such as iron, aluminum or the like for the purpose of protecting the vibration element 60. The vibration element 60 is generally provided with a backing member 63 for absorbing vibration generated in its back side.

The ultrasonic wave sensor 55 is designed to be a single device for conducting both of transmission and reception of the ultrasonic wave. Accordingly, the ultrasonic wave generated from the vibration element 60 is transmitted from a surface of the cap member 62, for example, along a passage indicated by two-dotted chain line 70 in FIG. 10 (hereafter, referred to as "transmitted wave"), reflected by the bottom surface 54a of the piston 54, and thereafter received along a passage indicated by two-dotted chain line 71 (hereafter, referred to as "received wave"). An electric signal corresponding to the ultrasonic wave received by the vibration element 60 is outputted through a wiring 58 to a transmission/reception circuit 56 and a control device 57.

The position of the piston 54 of the lift cylinder 50 is detected by measuring a time period required for reciprocating the ultrasonic wave between the ultrasonic wave sensor 55 and the bottom surface 54a of the piston 54, i.e., a delayed time of the received wave with respect to the transmitted wave (hereafter, referred to as "a measurement time length"). The position of the piston 54 thus detected can be used, for instance, for various controls regarding the fork of the fork lift.

The lift cylinder 50 provided with the ultrasonic wave sensor 55 for detecting the position of the piston 54 as described above is hardly affected by an environment use condition, and is remarkably effective in consecutively detecting the position of the piston 54 with ease.

However, the ultrasonic wave generated from the vibration element 60 contains an indirectly transmitted wave, i.e. a surface wave, (for example, a wave that is transmitted through an inner wall surface of the cylinder tube 52 along a passage indicated by two-dotted chain line 72 or 73 in FIG. 10). Since the surface wave indirectly transmitted through the inner wall of the cylinder tube 52 in this manner is detected as a reverberation by the ultrasonic wave sensor 55, the measurement accuracy of the measurement time length may be lowered. This phenomenon is explained in more detail with reference to FIGS. 10 and 11. FIG. 11 shows an example of wave forms of the transmitted wave and the received wave.

In FIG. 10, it is known that the surface wave transmitted along the passage indicated by the two-dotted chain line 72 or 73 is generally faster than the transmitted and received waves transmitted along the passages of the two-dotted chain lines 70 and 71. For this reason, as shown in FIG. 11, the surface wave faster in transmission is detected as the reverberation prior to the received wave transmitted along the passage 71 indicated by the two-dotted chain line 71 to interfere with the received wave. Accordingly, it is difficult to obtain an accurate measurement time length.

SUMMARY OF THE INVENTION

An object of the present invention is to provide a position detecting device for a hydraulic cylinder and an industrial vehicle equipped with the position detecting device, which can obtain an accurate measurement time length by reducing a reverberation that may interfere with transmitted and received waves transmitted directly.

A position detecting device for a hydraulic cylinder according to the present invention is a hydraulic cylinder position detecting device for detecting a position of a piston with a ultrasonic wave, the piston being movable within a cylinder, the detecting device including a ultrasonic wave sensor provided within the cylinder for transmitting the ultrasonic wave toward the piston and receiving the ultrasonic wave reflected by the piston, and an anti-vibration member for suppressing a vibration caused by an ultrasonic wave transmitted indirectly between the ultrasonic sensor and the piston.

Here, terms used in claims and the detailed description of the invention are interpreted as follows:

(1) The "piston" includes not only a type in which a movable member is slid within a cylinder (a so-called piston type cylinder) but also a type in which a clearance is formed between a movable member and an inner surface of a cylinder, such as a ram (protruded bar) of a ram type cylinder.

(2) The "indirectly" means using a medium other than a power medium (such as a hydraulic oil) of a cylinder during process in which a transmitted wave generated from an ultrasonic wave sensor is reflected by a piston and then received by the ultrasonic wave sensor. For example, the transmission along the passages indicated by the two-dotted chain lines 72 and 73 in FIG. 10 used for the explanation of the conventional lift cylinder is encompassed by the definition of the "indirectly" since the transmitted and received waves use the inner wall surface of the cylinder tube as a medium. In contrast, the transmission along the passages indicated by the two-dotted chain lines 70 and 71 is defined as the "directly" and is not encompassed by the "indirectly". The detection of the transmitted and received waves transmitted along a passage encompassed by the "directly" makes it possible to obtain an accurate measurement time length.

(3) The "anti-vibration member" is met as long as it suppresses a vibration caused by a ultrasonic wave (i.e., it is high in attenuation effect or absorbing effect), and includes not only members made of resin (such as polyphenylene sulfide (PPS) resin) but also members of various materials (such as FRP (fiber-reinforced plastic) material).

(4) The "grooved portion" is met as long as it has a recessed portion or a protruded portion, and includes various recesses or protrusions other than a planar surface. For example, not only linear, spiral and circular recesses but also protruded shapes or the like fall within the "grooved portion".

(5) The "industrial vehicle" means a vehicle which is provided with a hydraulic cylinder and which is provided with a member moved by driving of the hydraulic cylinder, and includes not only a fork lift but also a high site working vehicle, a concrete pump vehicle, a backhoe vehicle, a dump car and so on.

DETAILED DESCRIPTION OF THE PREFERRED EMBODIMENTS

Embodiments in which a hydraulic cylinder position detecting device according to the present invention is applied to a lift cylinder of a fork lift will be described.
Embodiment 1

First of all, a first embodiment will be described with reference to FIGS. 1 to 3.

Figure 1:
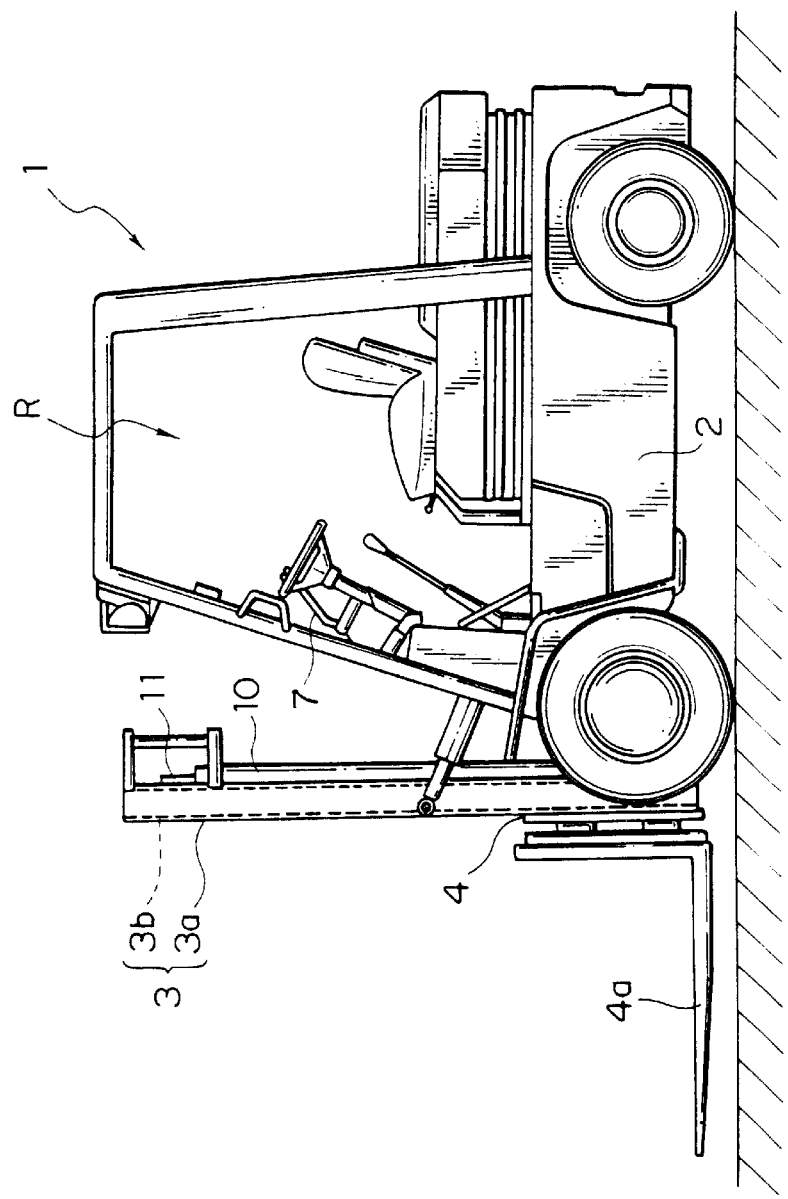
FIG. 1 is a side view of a fork lift using a hydraulic cylinder position detecting device according to a first embodiment of the present invention.

As shown in FIG. 1, a mast 3 is provided on a front portion of a vehicle body 2 of a fork lift 1 that is an industrial vehicle. The mast 3 is made up of an outer mast 3a and an inner mast 3b installed in an inner side of the outer mast 3a to be movable upwardly and downwardly. A lift bracket 4 having a fork 4a is supported onto an inner side of the inner mast 3b to be movable upwardly and downwardly.

A lift cylinder 10 serving as a hydraulic cylinder is disposed behind the mast 3. The leading end of a piston rod 11 is connected to an upper portion of the inner mast 3b. A chain wheel (not shown) is rotatably supported on the upper portion of the inner mast 3b. A chain (not shown) with one end connected to a lift bracket 4 and the other end connected to the upper portion of the lift cylinder is hung on the chain wheel. By operating a loading lever 7 provided in a driving room R, the lift cylinder 10 is protrudingly and retractingly driven so that the fork 4a together with the lift bracket 4 is moved upward and downwardly along the mast 3. A hydraulic cylinder using a hydraulic oil as a power medium is employed as the lift cylinder 10.

Next, the arrangement of the lift cylinder 10 will be described with reference to FIGS. 2 and 3.

Figure 2:
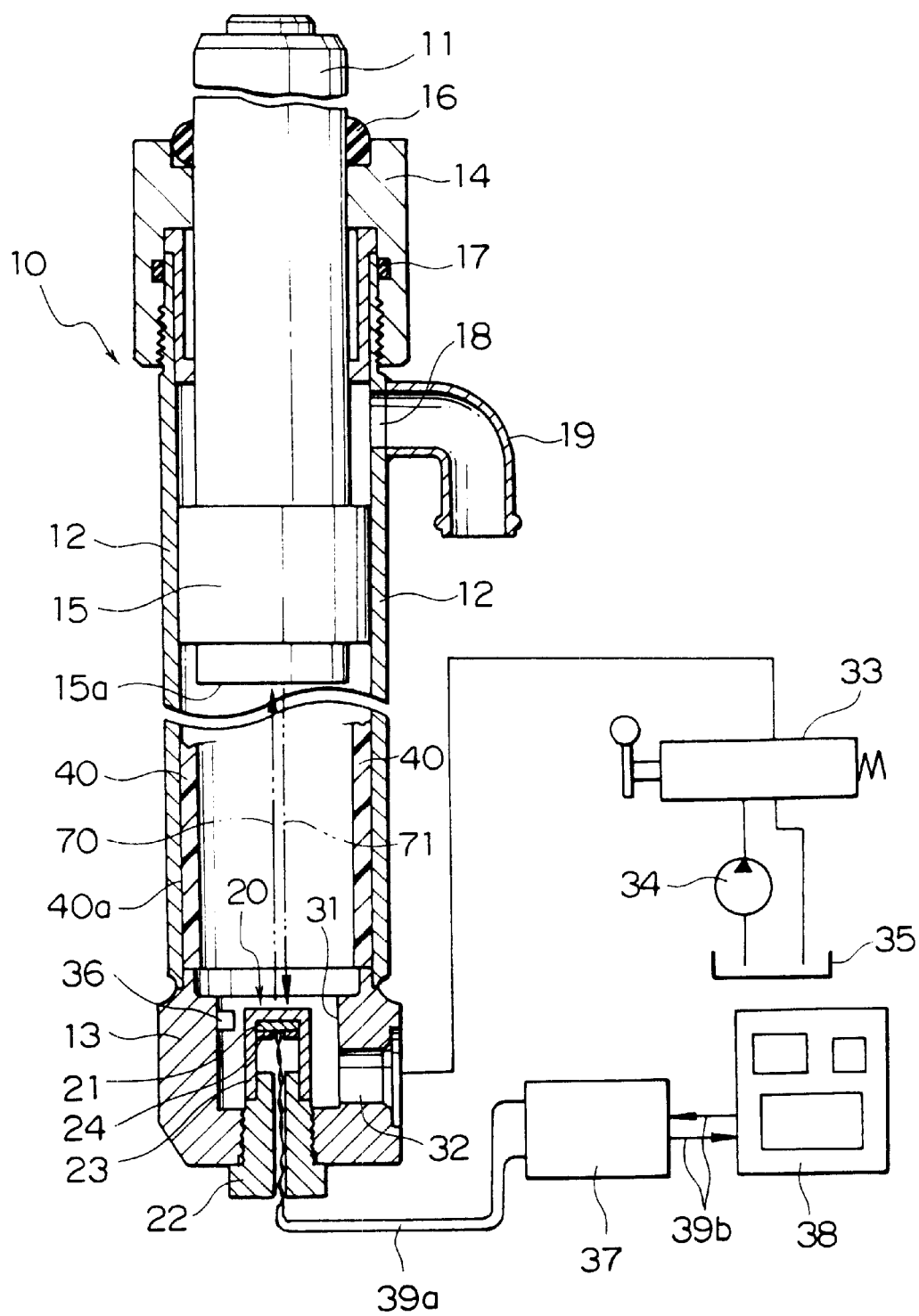
FIG. 2 is a view showing the hydraulic cylinder position detecting device.

As shown in FIG. 2, a single action type piston cylinder is employed as the lift cylinder 10. The lift cylinder 10 includes a cylindrical cylinder tube 12, a cylinder block 13, a rod cover 14, a piston rod 11, a piston 15 movable integrally with the piston rod 11, and so on. The lift cylinder 10 is installed on the fork lift 1 so that the cylinder block 13 is located at the lower side. The piston rod 11 is inserted into the cylinder tube 12, and a sealing member 16 is set on the insertion opening thereof. An O-ring is set between the outer circumferential surface of the cylinder tube 12 and the inner surface of the rod cover 14.

The cylinder tube 12 is formed with an exhaust port 18. An overflow pipe 19 is fixed to the exhaust port 18 so that the air compressed by the piston 15 is discharged through the overflow pipe 19 when the piston rod 11 is moved upwardly.

An inner wall of the cylinder tube 12 is provided with an anti-vibration member 40. The anti-vibration member 40 is formed into a cylindrical shape (an inner diameter d1, a thickness t1), and an outer circumferential surface 40a thereof is formed along an inner circumferential surface of the cylindrical tube 12. The anti-vibration member 40 is formed by coating resin high in ultrasonic wave attenuating effect (such as polyphenylene sulfide (PPS) resin). It suffices that this coating is carried out partially circumferentially, but the coating on a wider range will provide higher attenuation effect.

The anti-vibration member 40 may further be formed such that a cylindrical member high in ultrasonic wave attenuating effect (such as a resin-made tube) is inserted into the interior of the cylinder tube 12. The thickness t1 of the anti-vibration member 40 is not limited. However, in a case where the cylinder tube is of a type in which it is not slid on the piston (so-called a ram cylinder), the thickness t1 of the anti-vibration member 40 can be increased to obtain a higher attenuating effect.

The cylinder block 13 is formed with a chamber 31 accommodating an ultrasonic wave sensor 20 therein. Further, the cylinder block 13 is formed with a port 32 through which hydraulic oil to the lift cylinder 10 is supplied/discharged. The port 32 is connected through a conduit to a control valve 33, and then through a conduit and an oil pump 34 to an oil tank 35. Disposed within the chamber 31 is a thermosensor 36 for detecting a temperature of the hydraulic oil. The hydraulic oil is filled in the cylinder tube 12 to serve as power medium of the piston rod 11.

The ultrasonic wave sensor 20 is fixed to the cylinder block 13 so that a transmitter side thereof is confronted with the bottom surface 15a of the piston 15. The ultrasonic sensor 20 includes a vibration element 21, a cap member 23 covering the vibration element 21, and a case member 22 supporting such vibration element 21 through the cap member 23. The vibration element 21 is provided with a backing member 24 for absorbing a vibration generated at the rear side. The ultrasonic wave sensor 20 is designed to be a single device for conducting both of transmission and reception of the ultrasonic wave.

The cap member 23 has a disk-like bottom portion and a cylindrical side portion extending from the outer edge of the bottom portion, and is generally made of metal such as aluminum or the like for the purpose of protecting the vibration element 21. However, the cap member 23 per se may be made of material with ultrasonic wave attenuating effect (for example, FRP (fiber reinforced plastic)) to serve as the anti-vibration member. In this case, the vibration transmitted from the cap member 23 can be attenuated, thereby suppressing the generation of a reverberation.

The ultrasonic wave sensor 20 is electrically connected to a transmitter/receptor circuit 37 with a wiring 39a. The transmitter/receptor circuit 37 is electrically connected to a control device 38 with a wiring 39b. The transmitter/receptor circuit 37 is provided with an ultrasonic wave oscillator (not shown), which transmits (outputs) an ultrasonic wave signal of a predetermined frequency to the ultrasonic sensor 20 in response to a control signal from the control device 38. The transmitter/receptor circuit 37 has an amplifier and a detector (both not shown), so that an analog signal outputted from the ultrasonic sensor 20 is amplified as well as converted into a pulse signal to be outputted to the control device 38. The frequency outputted from the ultrasonic oscillator is appropriately set depending on the kind of the hydraulic oil, the kind of the ultrasonic sensor 20 or the like, and it is set to be, for example, a value of 0.1 to 5 MHz or thereabound.

In the first embodiment, the transmitter/receptor circuit 37, the control device 38, etc. together with the ultrasonic wave sensor 20 and the anti-vibration member 40 constitute a position detecting device of the present invention.

The position detecting device according to the first embodiment constructed as mentioned above can attenuate or absorb the vibration of the surface wave transmitted indirectly through the inner wall surface of the cylinder tube 12 by the virtue of the anti-vibration member 40 on the inner surface wall of the cylinder tube 12.

For example, it is possible to absorb a vibration transmitted from the surface of the vibration element 21 through the cap member 23, the case member 22 and the cylinder block 13 to the cylinder tube 12.

Accordingly, the generation of the reverberation, which may disturb the directly transmitted and received waves, can be reduced, thereby enabling the accurate measurement of the measurement time length.

Embodiment 2

Next, a second embodiment, in which a hydraulic cylinder position detecting device according to the present invention is applied to a lift cylinder of a fork lift similarly to the first embodiment, will be described with reference to FIG. 4.

Figure 3:
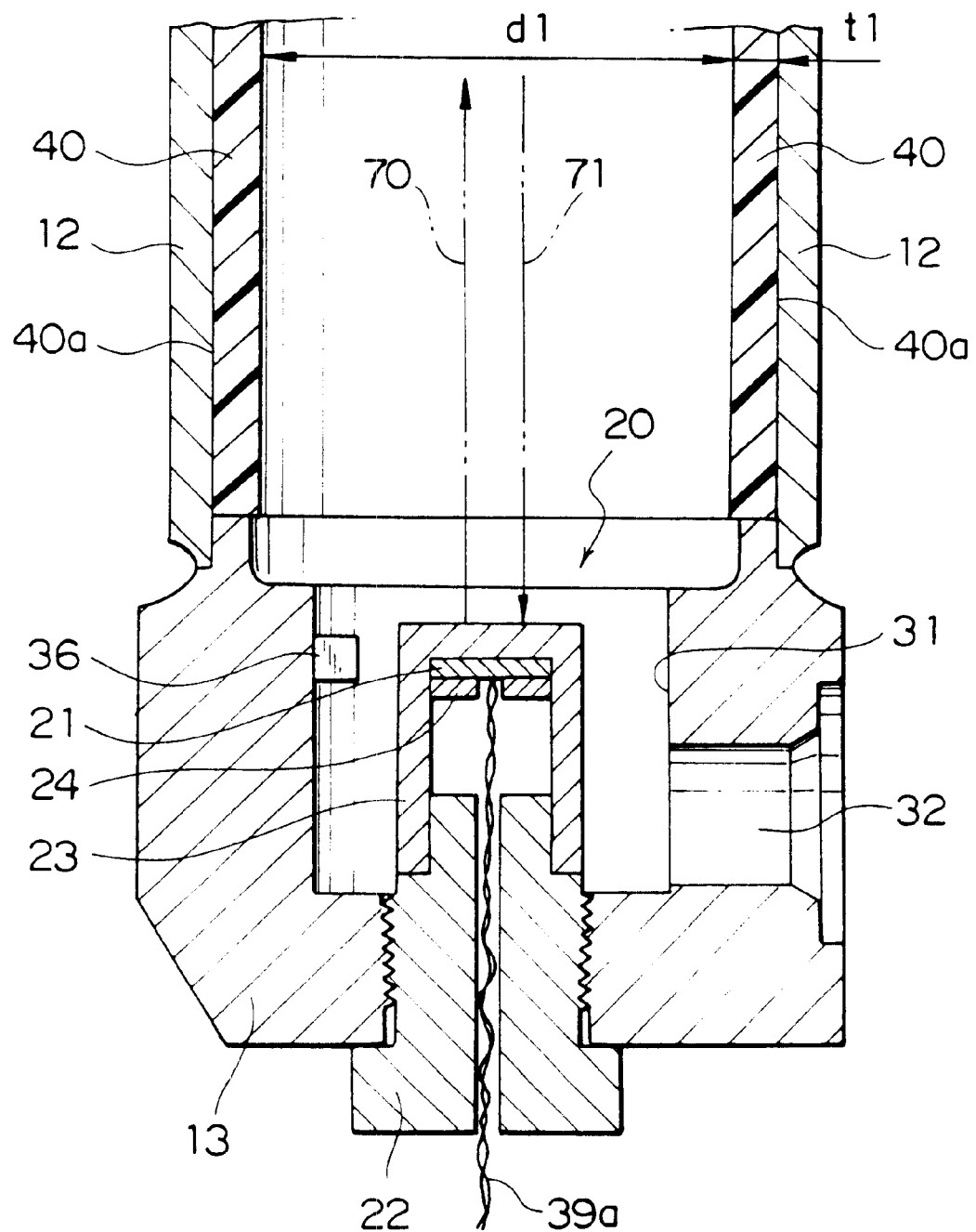
FIG. 3 is an enlarged, longitudinally sectional view showing an ultrasonic wave sensor and the vicinities thereof shown in FIG. 2.
Figure 4:
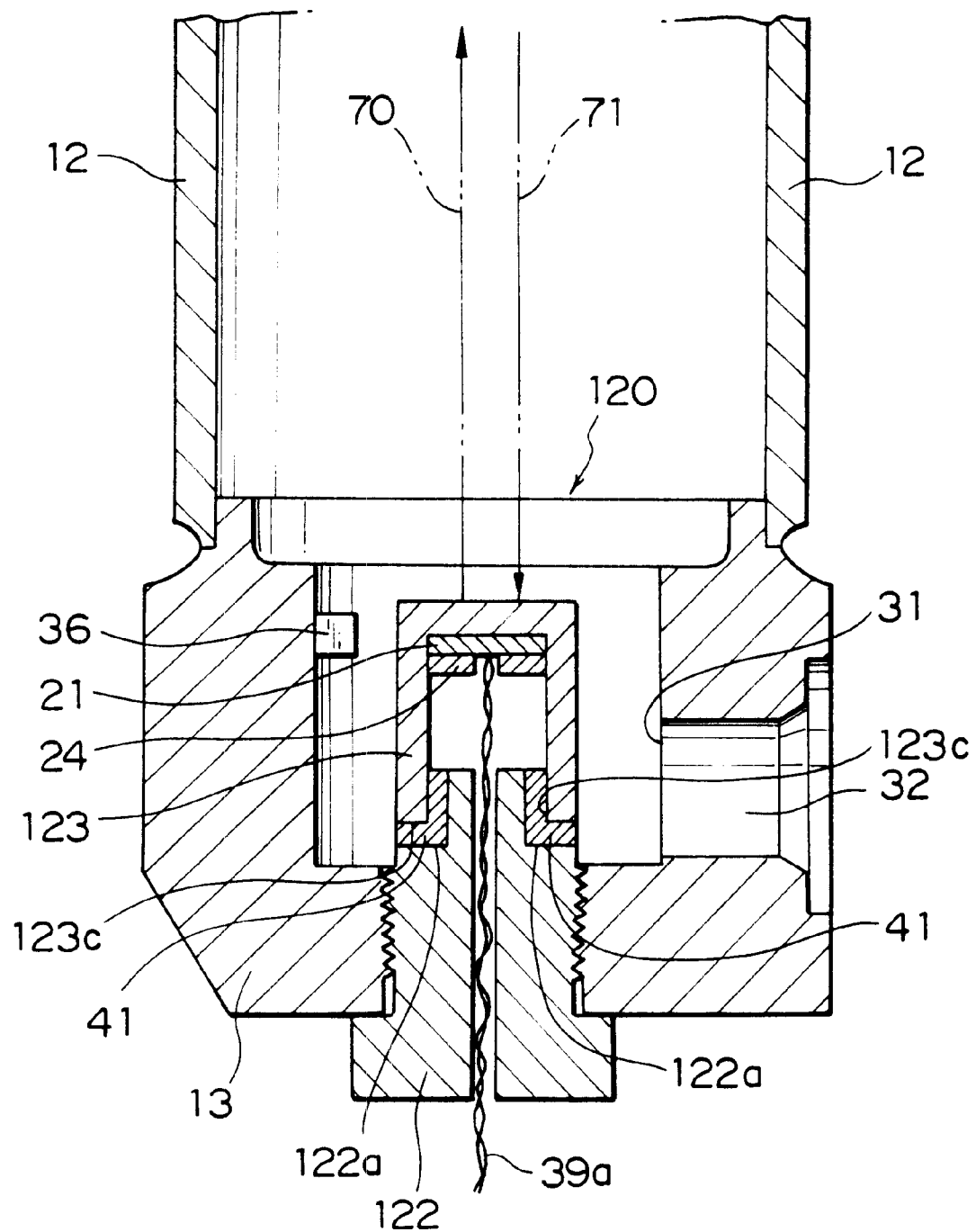
FIG. 4 is an enlarged, longitudinally sectional view showing an ultrasonic wave sensor and the vicinities thereof in a second embodiment.

In FIG. 4, elements which are the same as the elements shown in FIG. 3 are denoted by the same reference numerals. Further, arrangements or the like other than an ultrasonic wave sensor 120 are similar to those of the first embodiment, so that a difference of the second embodiment from the first embodiment will be described for the purpose of simplifying the explanation.

As shown in FIG. 4, an anti-vibration member 41 is set between an upper surface 122a of a case member 122 and a lower surface 123c of a cap member 123. The anti-vibration member 41 is formed from a rubber plate high in ultrasonic wave vibration attenuating effect (for example, a rubber plate into which powder lead is mixed). Therefore, the vibration on the cap member 123 is not transmitted to the case member 122 side.

In the second embodiment, the transmitter/receptor circuit 37, the control device 38, etc. together with the ultrasonic wave sensor 120 and the anti-vibration member 41 constitute the position detecting device of the present invention.

The position detecting device according to the second embodiment constructed as mentioned above can reduce the vibration transmitted indirectly between the cap member 123, the case member 122 and the cylinder block 13, the cylinder tube 12.

Therefore, the generation of the reverberation, which may disturb the directly transmitted and received waves, can be reduced, thereby enabling the accurate measurement of the measurement time length.

Embodiment 3

A third embodiment, in which the present invention is applied to a lift cylinder of a fork lift similarly to the first embodiment, will be described with reference to FIG. 5.

Figure 5:
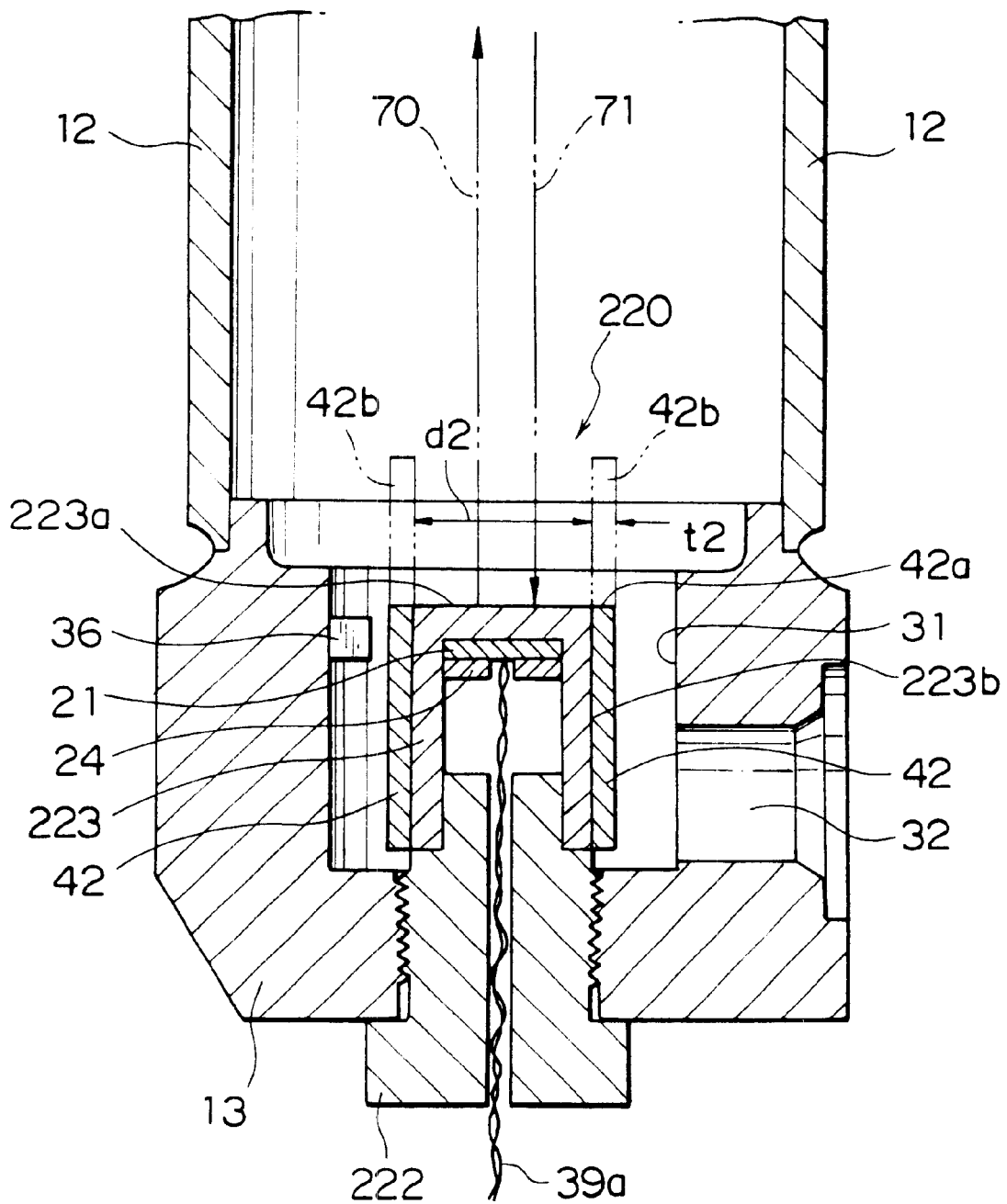
FIG. 5 is an enlarged, longitudinally sectional view showing an ultrasonic wave sensor and the vicinities thereof in a third embodiment.

In FIG. 5, elements which are the same as the elements shown in FIG. 3 are denoted by the same reference numerals. Further, arrangements or the like other than an ultrasonic wave sensor 220 are similar to those of the first embodiment, so that a difference of the third embodiment from the first embodiment will be described for the purpose of simplifying the explanation.

As shown in FIG. 5, an anti-vibration member 42 is provided on an outer circumferential portion of a cap member 223. The anti-vibration member 42 is formed into a cylindrical shape (an inner diameter d2, a thickness t2), and the inner diameter d2 of the anti-vibration member 42 corresponds to an outer diameter of the cap member 223. The anti-vibration member 42 is formed to have a height substantially the same as a height of the cap member 223. Therefore, the surface on an upper end 42a of the anti-vibration member 42 is located on the same plane as an upper surface 223a of the cap member 223. A clearance between the cap member 223 and the anti-vibration member 42 is adhered with a seal material or the like so as to avoid the entry of the hydraulic oil which may degrade the ultrasonic wave attenuating effect. The anti-vibration member 42 is formed from a rubber plate high in ultrasonic wave attenuating effect (for example, a rubber plate into which powder lead is mixed). The anti-vibration member 42 may be formed by coating a side surface 223b (a surface other than the upper surface 223a) of the cap member 223 with any kind of material high in attenuating effect.

In the third embodiment, the transmitter/receptor circuit 37, the control circuit 38, etc. together with the ultrasonic sensor 220 and the anti-vibration member 42 constitute the position detecting device of the present invention.

The position detecting device according to the third embodiment constructed as mentioned above can absorb or attenuate, using the anti-vibration member 42 on the side surface 223b of the cap member 223, the vibration transmitted indirectly between the side surface 223b of the cap member 223 and the bottom surface 15a of the piston 15, for example, the vibration transmitted from the side surface 223b of the cap member 223 to the case member 222.

Therefore, the generation of the reverberation, which may disturb the directly transmitted and received waves, can be reduced, thereby enabling the accurate measurement of the measurement time length.

As indicated by the two-dotted chain line 42b in FIG. 5, the upper end 42a of the anti-vibration member 42 may be elongated toward the piston side beyond the upper surface 223a of the cap member 223. If the height of the portion 42b protruding from the upper surface 223a of the cap member 223 is made larger, it will provide more enhanced directionability of the transmitted and received waves.

Embodiment 4

Next, a fourth embodiment, in which position detection device of the hydraulic cylinder according to the present invention is applied to a lift cylinder of a fork lift similarly as in the first embodiment, will be described with references to FIGS. 6 to 9. The fourth embodiment differs from the first embodiment with respect to the shape of the cap.

In FIGS. 6 to 9, elements which are the same as the elements shown in FIG. 3 are denoted by the same reference numerals. Further, arrangements or the like other than an ultrasonic wave sensor are similar to those of the first embodiment, so that a difference of the fourth embodiment from the first embodiment will be described for the purpose of simplifying the explanation.

Figure 6:
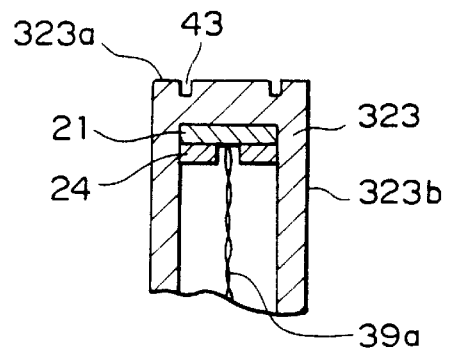
FIG. 6 is an enlarged, longitudinally sectional view showing a modification of a cap member in a fourth embodiment.

As shown in FIG. 6, a upper surface 323a of a cap member 323 is provided with a grooved portion 43 of an annular form. The grooved portion 43 is formed to correspond in location to the vibration element 21, and the size of the grooved portion 43 (an outer diameter of the annular portion) corresponds to an outer diameter of the vibration element 21.

A plurality of grooved portions 43 may be formed, and further, a plurality of grooved portions 43 different in size (to have different outer diameters of the annular portions) may be a formed on the upper surface 323a of the cap member 323.

Figure 7:
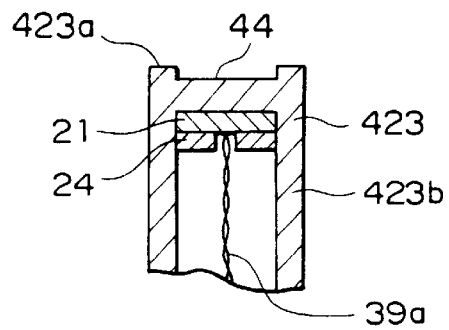
FIG. 7 is an enlarged, longitudinally sectional view showing another modification of the cap member in the fourth embodiment.

As a modification of the cap member 323 shown in FIG. 6, FIG. 7 shows a cap member 423 having an upper surface 423a on which a grooved portion 44 in the form of a circular recess is provided. The grooved portion 44 is formed to correspond in location to the vibration element 21, and the size of the grooved portion 44 (an outer diameter of the circular portion) corresponds to an outer diameter of the vibration element 21.

Figure 8:
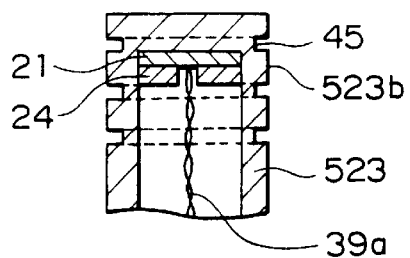
FIG. 8 is an enlarged, longitudinally sectional view showing further another modification of the cap member in the fourth embodiment.

As a modification of the cap member 323 shown in FIG. 6, FIG. 8 shows a cap member 523 having a side surface 523b on which a grooved portion 45 in the form of an annular shape is provided.

A plurality of annular grooved portions 45 may be formed on the side surface 523b of the cap member 523.

Figure 9:
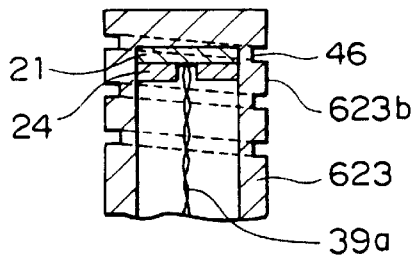
FIG. 9 is an enlarged, longitudinally sectional view showing yet another modification of the cap member in the fourth embodiment.
Figure 10:
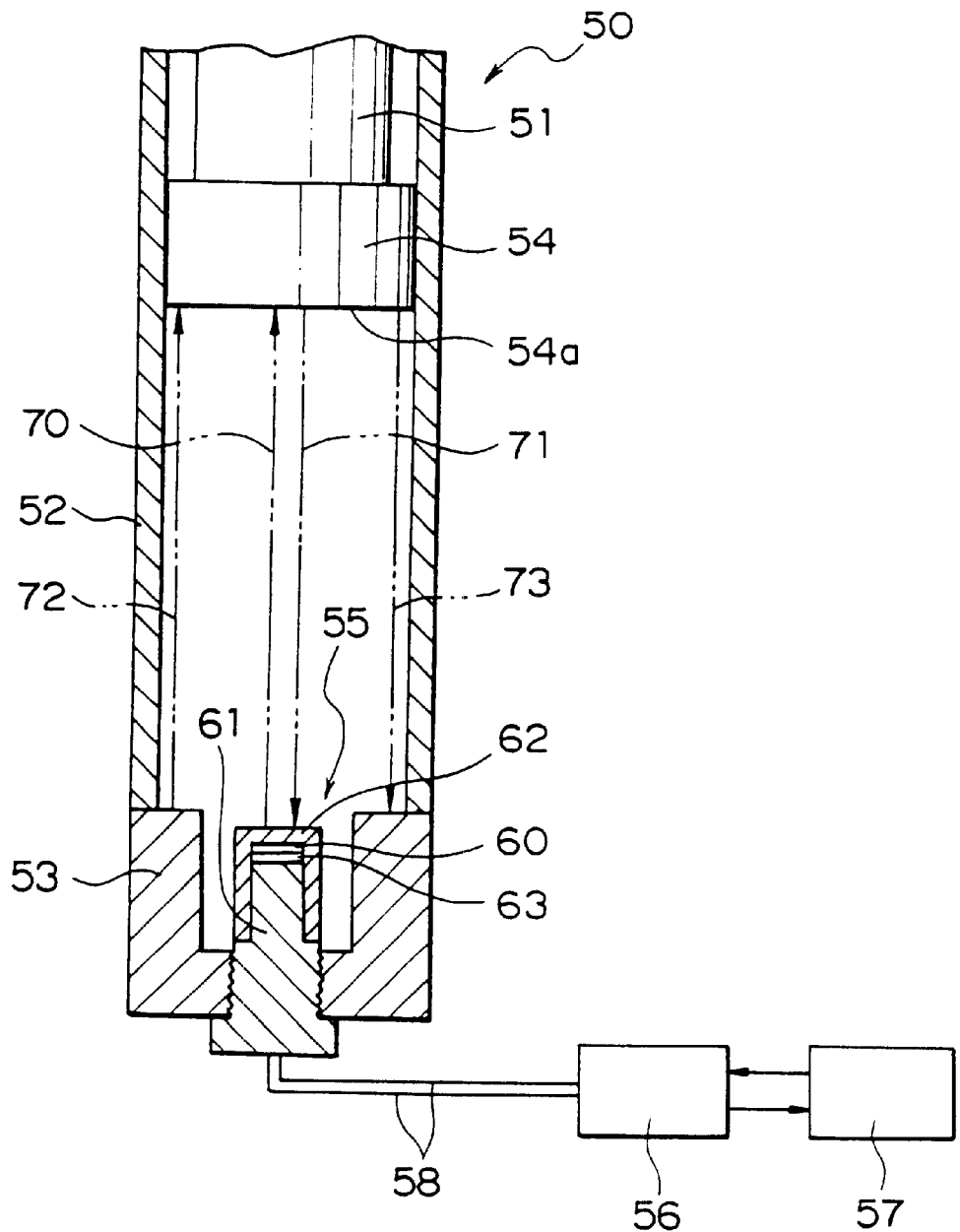
FIG. 10 is a view showing a conventional position detecting device for a hydraulic cylinder.
Figure 11:
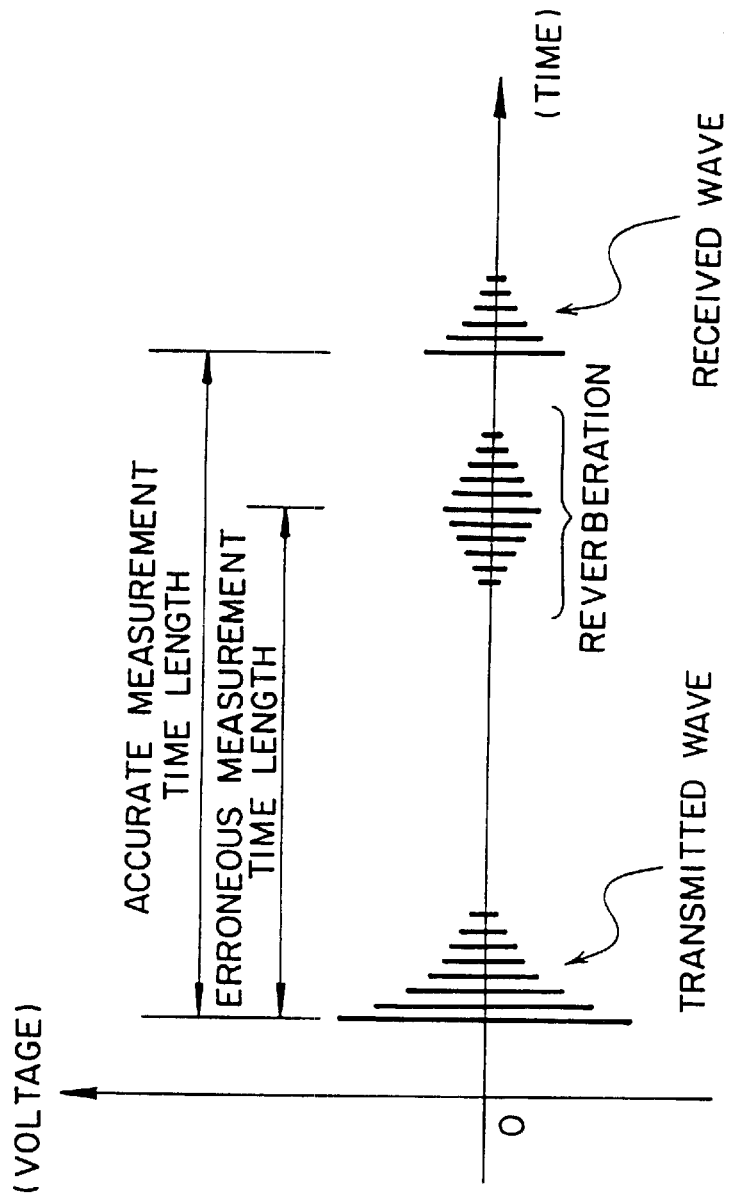
FIG. 11 is a view showing an example of wave forms of a transmitted wave and a received wave.

As a modification of the cap member 523 shown in FIG. 8, FIG. 9 shows a cap member 623 having a side surface 623b on which a grooved portion 46 in the form of a spiral shape is provided.

Each of the position detecting devices according to the fourth embodiment constructed as shown in FIGS. 6 to 9 can suppress, using the grooved portion 43, 44, 45, 46 on the upper surface of the cap member 323, 423, 523, 623 or on the side surface thereof, the vibration of the ultrasonic wave transmitted indirectly among the cap member 323, 423, 523 or 623, the case member 22, the cylinder block 13 and the cylinder tube 12. For example, it is possible to attenuate or absorb the vibration which has been transmitted from the vibration element 21 to the upper surface of the cap member 323, 423, 523 or 623 and which is likely to be transmitted in the direction toward the side surface thereof.

Therefore, the generation of the reverberation, which may disturb the directly transmitted and received waves, can be reduced, thereby enabling the accurate measurement of the measurement time length.

In addition, the present invention should not be restricted to the embodiments described above, and various modifications or applications are conceivable.

The first to fourth embodiments have been described such that the anti-vibration members 40–42, and the grooved portions 43–46 are taken alone, but the anti-vibration members 40–42, and the grooved portions 43–46 may be used in combination. Of course, in a case where all of the embodiments are combined together, it is possible to reduce the generation of the reverberation most effectively, and measure the measurement time length more accurately.

The anti-vibration member may be provided at any location as long as it is located between the ultrasonic sensor 20 and the piston 15. Further, for example, the grooved portions 43–46 illustrated in FIGS. 6 to 9 may be formed on the inner wall surface of the cylinder tube 12. By forming the grooved portion on the inner wall surface of the cylinder tube 12, it is possible to attenuate or absorb the vibration of the surface wave transmitted through the inner wall surface of the cylinder tube 12.

The material and shape of the anti-vibration members 40–42 or the shape or the like of the grooved portions 43–46 may be changed in various manners depending on the necessity.

Although the present invention has been described with reference to a case where the lift cylinder 10 using hydraulic oil is used as the hydraulic cylinder, the present invention may be applied to other hydraulic cylinders using various power media. For example, the present invention may be applied to an air cylinder using air.

The lift cylinder is constructed as a single action type cylinder, but may be constructed to be a plural action type in place of the single action type. The present invention can be applied to not only the lift cylinder 10 of the fork lift 1 but also to a tilt cylinder, a side shift cylinder, and a cylinder for a power steering.

The present invention can be applied to a ram type cylinder other than a piston type cylinder.

Although the ultrasonic wave sensor 20 is constructed as a single device for transmitting and receiving the ultrasonic wave, the ultrasonic wave sensor may be made up of a transmitter device and a receptor device which are separately formed from each other.

Although the present invention has been described with reference to the lift cylinder 10 of the fork lift 1, the present invention can be applied, other than the fork lift, to a high site working vehicle, a concrete pump vehicle, a backhoe vehicle, a dump car and so on, having a cylinder.

As described above, the present invention can realize the hydraulic cylinder position detecting device and the industrial vehicle having the hydraulic cylinder position detecting device, in which the accurate measurement time length can be obtained by reducing the generation of the reverberation that may disturb the directly transmitted and received waves.

What is claimed is:

1. A hydraulic cylinder position detecting device for detecting a position of a piston with an ultrasonic wave, the piston being movable within a cylinder, the detecting device comprising:

an ultrasonic wave sensor provided within the cylinder for transmitting the ultrasonic wave toward the piston and receiving the ultrasonic wave reflected by the piston;

an anti-vibration member for suppressing an indirect ultrasonic wave transmission through the cylinder; and a detection means for detecting the position of the piston by measuring a time period required for reciprocating the ultrasonic wave between the ultrasonic wave sensor and a bottom surface of the piston.

2. The hydraulic cylinder position detecting device according to claim 1, wherein the anti-vibration member is provided on an inner wall surface of the cylinder.

3. An industrial vehicle provided with the hydraulic cylinder position detecting device according to claim 1.

4. The hydraulic cylinder position detecting device according to claim 1, wherein the ultrasonic wave sensor includes:
   a case member fixed to the cylinder;
   a cap member mounted to the case member to define a closed space between the cap member and the case member, the cap member having a bottom portion and a side portion, the bottom portion being faced to the piston; and
   a vibration element fixed to an inner surface of the bottom portion of the cap member within the closed space.

5. The hydraulic cylinder position detecting device according to claim 4, wherein the anti-vibration member is provided between the cap member and the case member.

6. The hydraulic cylinder position detecting device according to claim 4, wherein the anti-vibration member is provided on an outer surface of the side portion of the cap member.

7. The hydraulic cylinder position detecting device according to claim 4, wherein the cap member includes a grooved portion on an outer surface thereof for suppressing the vibration transmitted indirectly between the ultrasonic wave sensor and the piston.

8. The hydraulic cylinder position detecting device according to claim 7, wherein the grooved portion has an annular shape formed on an outer surface of the bottom portion of the cap member.

9. The hydraulic cylinder position detecting device according to claim 7, wherein the grooved portion is a circular recess formed on an outer surface of the bottom portion of the cap member.

10. The hydraulic cylinder position detecting device according to claim 7, wherein the grooved portion has an annular shape provided on an outer surface of the side portion of the cap member.

11. The hydraulic cylinder position detecting device according to claim 7, wherein the grooved portion has a spiral shape provided on an outer surface of the side portion of the cap member.

12. The hydraulic cylinder position detecting device according to claim 4, wherein the cap member is made of material with anti-vibration effect.

* * * * *

UNITED STATES PATENT AND TRADEMARK OFFICE
CERTIFICATE OF CORRECTION

PATENT NO.    : 6,435,031 B1
DATED         : August 20, 2002
INVENTOR(S)   : Nagai It is certified that error appears in the above-identified patent and that said Letters Patent is hereby corrected as shown below:

<u>Column 7,</u>
Line 32, please delete "be a formed" and insert therefor -- be formed --;

Signed and Sealed this

Eleventh Day of February, 2003

JAMES E. ROGAN
*Director of the United States Patent and Trademark Office*